Patented Sept. 19, 1950

2,522,538

UNITED STATES PATENT OFFICE 2,522,538

BRONZE PIGMENT AND METHOD OF MAKING THE SAME

Francis B. Rethwisch, Louisvile, Ky., and Gordon M. Babcock, Plainfield, N. J., assignors to Reynolds Metals Company, Richmond, Va., a corporation of Delaware No Drawing. Application September 19, 1945, Serial No. 617,444

6 Claims. (Cl. 106—290)

The object of the present invention is to provide an improved "bronze" powder or paste pigment material, employing any suitable metals or metal alloys. A characteristic of our method is the employment of high molecular weight aliphatic amines, and in one phase of the method one or a mixture of such amines forms the primary leafing agent in the conversion of the metal into a leafing powder or paste. In another phase of the method one or a mixture of said amines may be employed in the treatment of previously prepared dry leafing powder in the formation of a leafing paste in which the metallic leafing particles have been brought into extreme fineness.

The invention is based upon the discovery that high molecular weight aliphatic amines, and particularly those of the group hereinafter specified, said group having a molecular weight of above 185, are not only superior leafing agents, but also mix and disperse more completely and more easily in the conventional fluid vehicles employed in paint and varnish manufacture, and result in an improved color in the leafing metallic particles.

There are further special advantages which will hereinafter be set forth.

Example I

As an example, aluminum foil scrap broken down to 20–24 mesh, or aluminum granules, or aluminum in other convenient form, is placed in a ball mill which, for the purposes of this example, may be considered as about nine feet long and three feet in diameter, containing 4,000–7,000 pounds steel balls. These steel balls may be graded, as customary, and may range from ¼ inch to ¾ inch, although such size may be varied. A given amount of mineral spirits is added with a given proportion of octadecylamine,

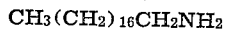

Varnolene or other standard paint thinners will serve as the mineral spirits. The ratio of weight of mineral spirits to the aluminum feed used will range from 1 to 1, to 2 to 1, and the concentration of octadecylamine from 2%–10% of the mineral spirits.

In the operation of the ball mill the aluminum will be brought into a flake form of powder which has a large surface area, as to the individual particles, and as the action proceeds the particles are progressively diminished in size. When the particles are of such size as to pass through a screen of selected fineness, for example, 325 mesh, with retention on the screen of about 1%– 1.5% of larger particles, a highly satisfactory leafing powder, paste, or free flowing fluid will result in accordance with subsequent treatment. Thus, if a dry product is required the liquid can be evaporated, as customary in the art, or the fluid may be merely reduced, in the formation of a paste pigment.

Usually when the aluminum flake is reduced to the desired size, a filter cake is formed, which then can be adjusted to the desired metallic content with mineral spirits.

As stated, the flake leafing pigment thus produced possesses a superior color to that produced by the use of stearic acid and like leafing agents. Furthermore, the pigment thus produced possesses properties as a fungicide, germicide, and to certain degree, as an algaecide. Also there is less tendency toward surface "skin" formation in the containers for paints employing the pigment.

Example II

Scrap aluminum foil is brought by the action of a hammer mill to particles of 140–170 mesh in the presence of stearic acid so as to produce a fully leafing powder, known as standard varnish powder. This leafing powder is a commercial product available on the open market. This powder is placed in a ball mill with proportions of mineral spirits and a high molecular weight aliphatic amine, octadecylamine being preferred, as in Example I. The ball mill is operated until the particles are reduced in size to pass through a screen of 325 mesh with a retention of not more than 1.5% on the screen. At this point the mineral spirits may be reduced in proportion to result in a paste pigment, or the mineral spirits may be removed for the production of a powder, as desired.

Example III

Aluminum scrap is subjected to the action of a hammer mill, as customary, employing a high molecular weight aliphatic amine in substitution of the stearic or other fatty acid leafing agent customarily employed, and the stamping continued until the leafing powder thus produced will pass through a screen of 325 mesh with a retention of not more than 5% of the leafing powder. The powder may be still further reduced in particle size if desired, but generally the fire hazard increases with the degree of fineness, and that specified is sufficient for all normal purposes. The leafing powder is particularly adapted for paper coatings with water-base adhesives, such as starch, casein, and gums, there being easier dispersion in the fluid carrier, better color in the dry product, and less "rub-off."

The class of high molecular weight aliphatic amines includes the stated octadecylamine $CH_3(CH_2)_{16}CH_2H_2$; tetradecyl amine $$CH_3(CH_2)_{12}CH_2NH_2$$

hexadecyl amine $CH_3(CH_2)_{14}CH_2NH_2$, and others. All of these amines have a molecular weight of above 185 and ranging to approximately 300, with melting points above 24° C.

In some cases it may be found desirable to use two or more of the said high molecular weight aliphatic amines in combination, and the examples will be understood accordingly.

It will also be understood that while aluminum is used as an illustration, other metals, particularly copper may be employed, together with their alloys, in the production of flake leafing pigments in paste, dry powder or fluid from. Thus the examples are illustrative and will form the basis of various modifications apparent to those skilled in the art.

In the claims, the word "reducing" as applied to metallic powder, refers to the physical change of imparting fineness, i. e., reduction in size of the metallic particles; the word "ball mill" refers more particularly to a cylindrical mill operating with its long axis in a horizontal position, and with open trunnions; the word "leafing" as applied to the metallic pigment refers to the ability of the pigment particles to rise to the surface of a suitable vehicle such as varnish, oil, lacquer and so forth, to form a continuous bright metallic film.

Our preferred charge for ball mill action is: 7500 lbs. balls, 320 lbs. standard varnish powder, 25 lbs. octadecylamine, 87 gallons mineral spirits.

Our preferred charge for stamping action is: Prepare 20 mesh from aluminum foil "rosebuds" with 1% of the aliphatic high molecular weight amine, for example, octadecylamine, added. Run in fine stamps adding octadecylamine to keep the concentration at 1½ to 2 per cent. Powder is then polishd dry or with the addition of more octadecylamine.

Having thus described our invention and illustrated its use, what we claim as new and desire to secure by Letters Patent is:

1. A method for producing an improved flake metal leafing powder, which consists of subjecting the metal in comminuted form, during a hammer reduction thereof as to particle size, to the action of a straight chain aliphatic amine, having no less than 14 carbons and molecular weights ranging from 185 to 300 the proportion of said amine to the metal being between 1½% and 20%.

2. A method for reducing flake metal powder and imparting improved leafing qualities thereto, which consists of subjecting said powder, during a hammer reduction of the metal as to particle size, to the action of from 2% to 20% by weight, of a straight chain aliphatic amine having no less than 14 carbons and molecular weights ranging from 185 to 300.

3. A method for reducing flake metal powder and imparting improved qualities thereto which consists in hammering such powder in the presence of octadecylamine and mineral spirits during reduction of the powder as to particle size, the octadecylamine being in proportion from 2–10% of the mineral spirits and the ratio of weight of mineral spirits to the metal powder ranging from 1 to 1 to 2 to 1.

4. A method for reducing flake metal powder, and imparting improved leafing qualities thereto, which consists of subjecting said flake metal powder, during a hammer reduction of the metal as to particle size, to the action of from 2% to 20% of octadecylamine.

5. A pigment material consisting of flake bronze powder, the particles having on their surfaces a leafing film consisting of a straight chain aliphatic amine having no less than 14 carbons and molecular weights ranging from 185 to 300, and resulting from the hammer-reduction of said powder as to particle size in the presence of between 1½% and 20% of said amine relatively to the powder.

6. A pigment material consisting of flake bronze powder, the particles having on their surfaces a leafing film consisting of octadecylamine.

FRANCIS B. RETHWISCH.
GORDON M. BABCOCK.

REFERENCES CITED

The following references are of record in the file of this patent:

UNITED STATES PATENTS

| Number | Name | Date |
| --- | --- | --- |
| 2,178,181 | McMahan | Oct. 31, 1939 |